United States Patent [19]

Freeman et al.

[11] Patent Number: 4,809,186

[45] Date of Patent: Feb. 28, 1989

[54] POSTAGE METER FOR METERING MIXED WEIGHT MAIL

[75] Inventors: Gerald C. Freeman, Darien; Seymour Feinland, Stamford; Raymond R. Crowley, Newtown, all of Conn.

[73] Assignee: Pitney Bowes Inc., Stamford, Conn.

[21] Appl. No.: 909,152

[22] Filed: Sep. 19, 1986

[51] Int. Cl.$^4$ ............................................. G06F 15/20
[52] U.S. Cl. ...................................... 364/464; 101/94
[58] Field of Search ................... 101/43, 91; 364/464, 364/466

[56] References Cited

U.S. PATENT DOCUMENTS

| | | | |
|---|---|---|---|
| 3,965,815 | 6/1976 | Lupkus et al. | 101/91 |
| 3,978,457 | 7/1976 | Check et al. | |
| 4,034,669 | 7/1977 | Freeman | 101/91 |
| 4,050,374 | 4/1977 | Check | 101/91 |
| 4,253,015 | 2/1981 | McFiggans et al. | 377/32 |
| 4,287,825 | 5/1981 | Eckert et al. | 101/91 |
| 4,301,507 | 11/1981 | Soderberg et al. | 364/464 |
| 4,302,821 | 1/1981 | Eckert et al. | 364/900 |
| 4,635,205 | 1/1987 | Eckert, Jr. et al. | 364/464 |

Primary Examiner—Parshotam S. Lall
Assistant Examiner—Edward R. Cosimano
Attorney, Agent, or Firm—Peter Vrahotes; Melvin J. Scolnick; David E. Pitchenik

[57] ABSTRACT

A postage meter having an improved throughput for processing mixed weight mail. A postage meter is provided with a commnications link for receiving signals from a system for determining postage amounts and transporting mailpieces. A first signal is provided indicating that a next postage amount will be determined, and in response the postage meter performs common, preliminary steps to enable setting indicia to correspond to the next postage amount. A second signal defining the next postage amount is then received and the postage meter sets its indicia to correspond. In one embodiment of the subject invention the meter may then send a signal requesting transport of the next mailpiece. The meter may then implement common enabling steps for printing while the mailpiece is in transport. In still another embodiment the next postage amount is compared to the last postage amount to which the indicia are set, and if they are equal setting of the indicia is bypast.

19 Claims, 7 Drawing Sheets

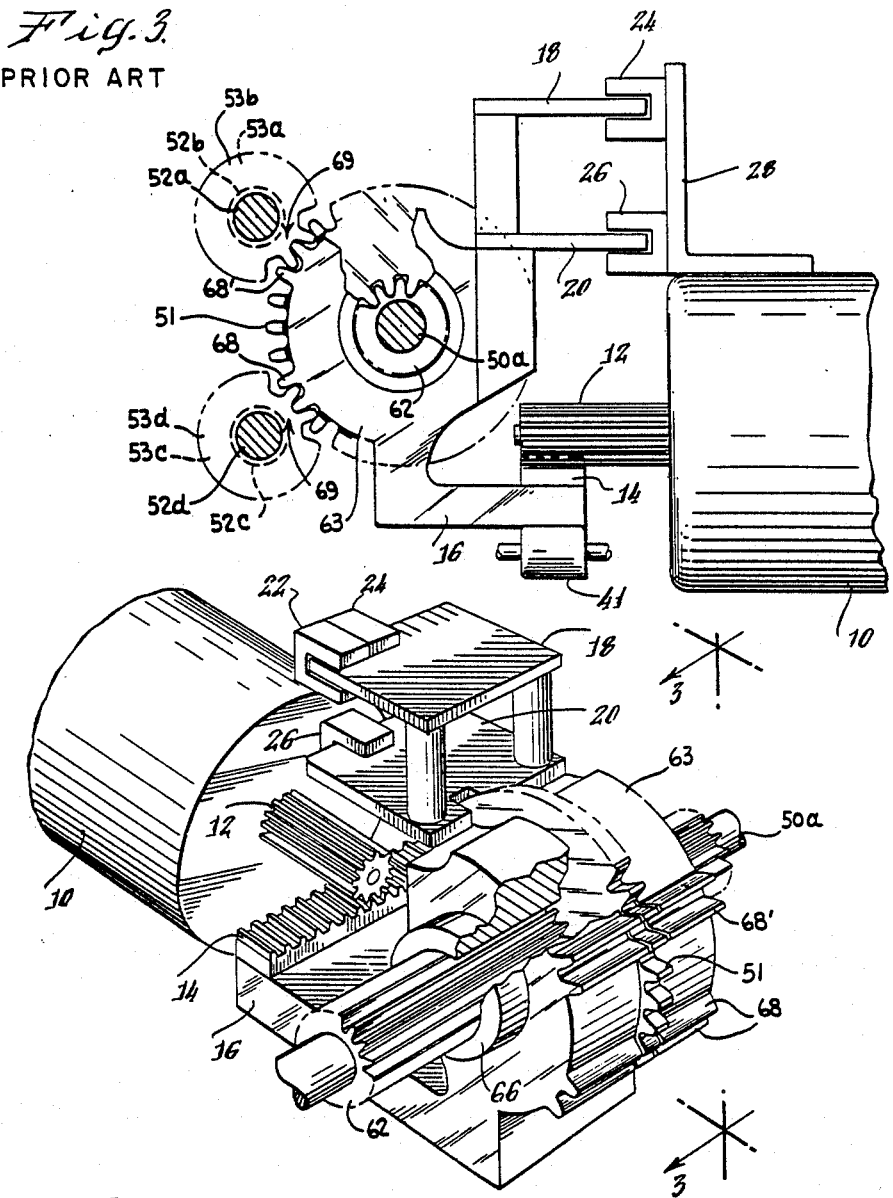

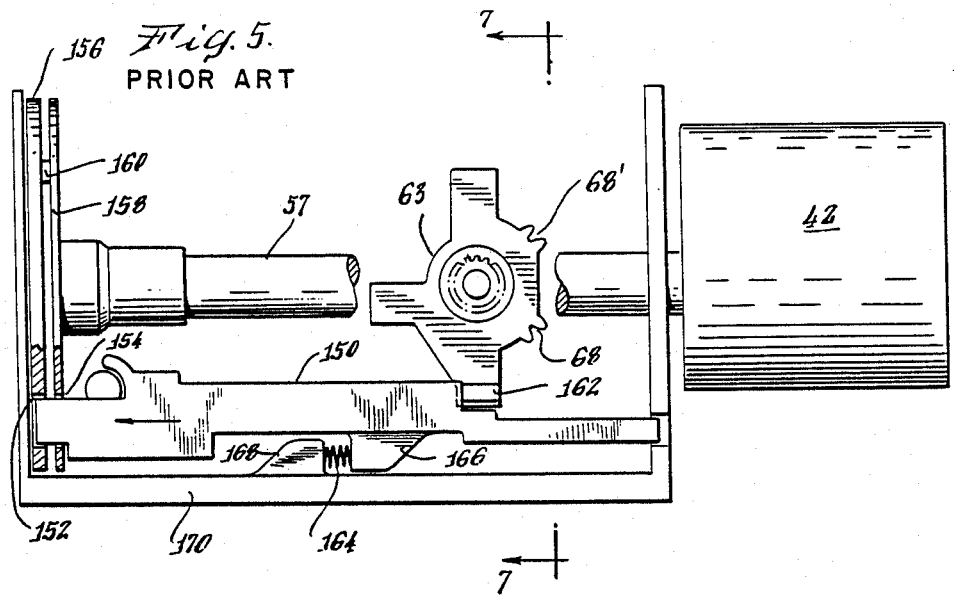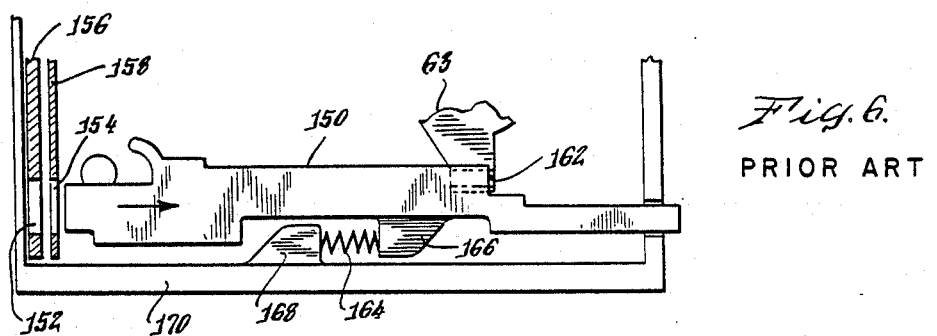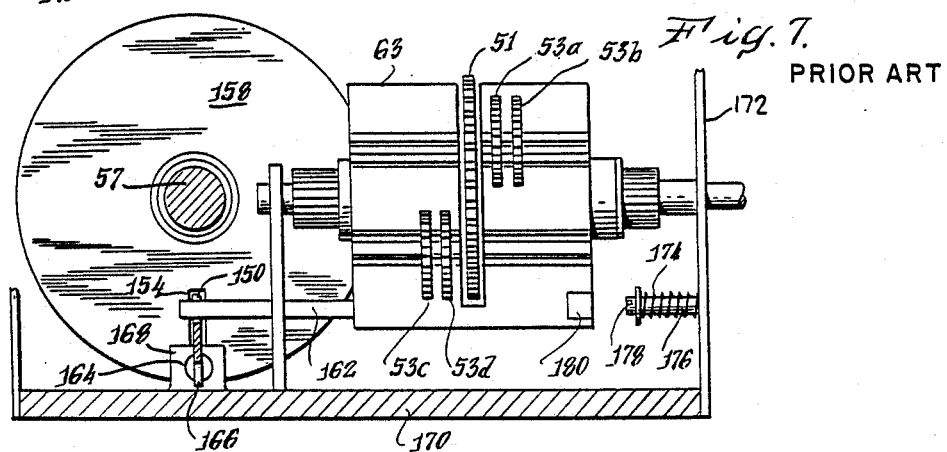

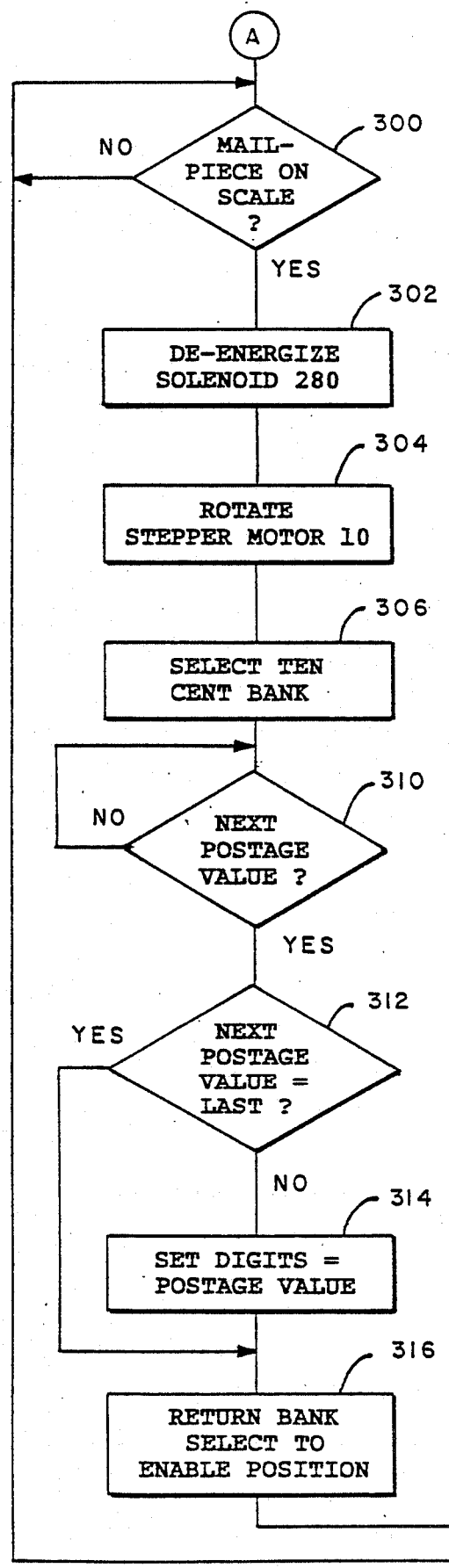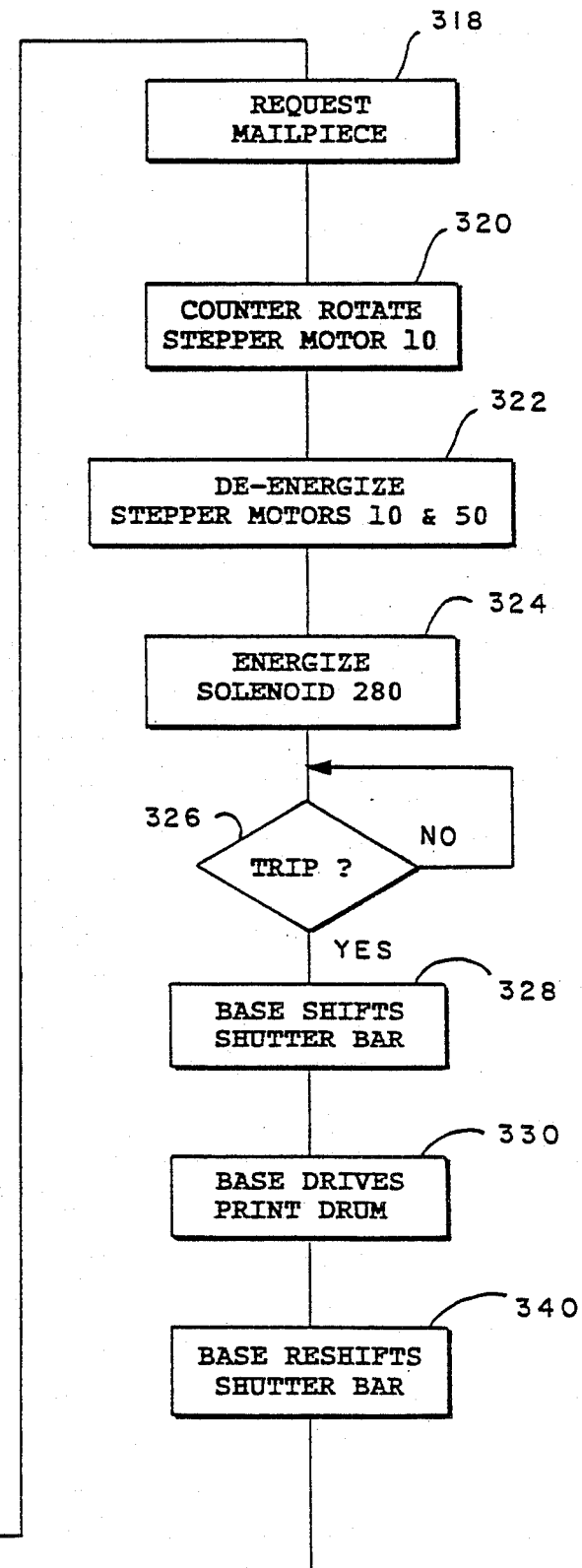
FIG. 12

POSTAGE METER FOR METERING MIXED WEIGHT MAIL

BACKGROUND OF THE INVENTION

Field of the Invention

The subject invention relates to electronic postage meters. More particularly, it relates to electronic postage meters of the type in which postage amounts may be set in response to an external signal.

Postage meters of the above type are known and are described, for example, in U.S. Pat. No. 4,301,507; to: Soderberg et al.; for: Electronic Postage Meter having Plural Computing Systems; issued: Nov. 17, 1981, which is hereby incorporated by reference. The postage meter taught in the above referenced patent is particularly adapted for control by an external device. Such meters are useful in systems for weighing streams of mixed weight mail where mailpieces are fed to a postal scale, weighed and the appropriate postage amount determined, a postage meter set to correspond to the appropriate postage amount, and the mailpiece fed to the postage meter. Such a system is disclosed in the commonly assigned, co-pending application Ser. No. 909,153, filed Sept. 9, 1986, entitled Mailing System for Mixed Weight Mail; to Freeman et al.; filed on even date herewith.

Since, in general, the setting of the indicia printed by the postage meter in such a system may change with each mailpiece, it is clearly desirable to reduce the time required to change such settings in order to increase the thoughput through such systems. However, though postage meters such as those described in the above referenced patent are controlled by highly advanced electronics including microprocessors, the actual printing of indicia remains a mechanical operation. Such printers include complex electromechanical means for printing indicia whose reliability and accuracy is well established. The complexity of these printing and setting mechanisms is increased by an extensive system of interlocks to avoid printing indicia without accounting for the corresponding postage amount. Because of the complexity of these mechanisms, and the need to establish that any replacement mechanism is substantially as reliable and accurate, it is believed that any effort to develop a replacement mechanism will be lengthy, dificult, and expensive.

Thus, it is an object of the subject invention to provide a postage meter having a reduced setting time.

It is a further object of the subject invention to provide a postage meter suitable for use in systems for metering mixed weight mail.

It is a still further object of the subject invention to provide such a postage meter which will require minimal changes to the printing and setting mechanism.

BRIEF SUMMARY OF THE INVENTION

The above objects are achieved and the disadvantages of the prior art are overcome in accordance with the subject invention by means of a postage meter for printing indicia corresponding to predetermined postage amounts, and for accounting for said postage amounts when said indicia are printed, and which includes apparatus for receiving signals. The meter of the subject invention responds to a first signal which indicates that a next postage amount will be determined by implementing common preliminary steps necessary for setting said indicia to correspond to the next postage amount. Such preliminary steps may include: assuring that a shutter bar interposer is engaged; releasing a bank select home position lock; and selecting the initial bank to be set. The meter of the subject invention is further responsive to a second subject received when the appropriate postage amount is determined for setting the indicia to correspond to the next postage amount.

In another embodiment of the subject invention the postage meter includes apparatus for transmitting a signal requesting the next mailpiece when the indicia are set to the appropriate postage amount.

In another embodiment of the subject invention, the postage meter implements common enabling steps necessary for printing of the indicia after transmitting the signal requesting the next mailpiece. Such common enabling steps may include: locking the bank select home position lock, deenergizing the bank select and digit select motors, and disengaging the shutter bar interposer.

In still another preferred embodiment of the subject invention, the postage meter will include a comparator for comparing each postage amount with the previous postage amount and will implement the common enabling steps without attempting to reset the indicia printing mechanism.

Those skilled in the art will recognize that embodiments of the subject invention achieve the above objects by overlapping the time required to implement certain preliminary steps necessary for setting a postage meter with the time required to determine the next postage amount, and overlapping the time required to implement certain common steps necessary to enable printing with the time required to transport a mailpiece to the meter. They will further recognize that this has been advantageously acheived without the need for mechanical change to the printing and setting mechanism, but were achieved by a restructuring of the control mechanism of a postage meter from previous configurations where all steps necessary to reset and print had to be carried out before transport of a mailpiece to the meter.

Other objects and advantages of the subject invention will be apparent to those skilled in the art from consideration of the attached drawings and the detailed description set forth below.

BRIEF DESCRIPTION OF THE DRAWINGS

FIG. 2 is an enlarged, partially cut away perspective view of the yoke, master drive gear, splined shaft and position indicator of the mechanism of FIG. 1.

FIG. 3 is a view taken along line 3—3 in FIG. 2.

FIG. 5 is an elevation of a print interlock mechanism, in a blocking position, generally taken along lines 5—5 of FIG. 1.

FIG. 6 is an elevation of the print interlock mechanism in a release position.

FIG. 7 is a view of the print interlock mechanism taken along lines 7—7 in FIG. 5.

FIG. 12 is a flow chart of the control of a postage meter printing and setting mechanism in accordance with the subject invention.

DETAILED DESCRIPTION OF THE PREFERRED EMBODIMENT

Figure 1:
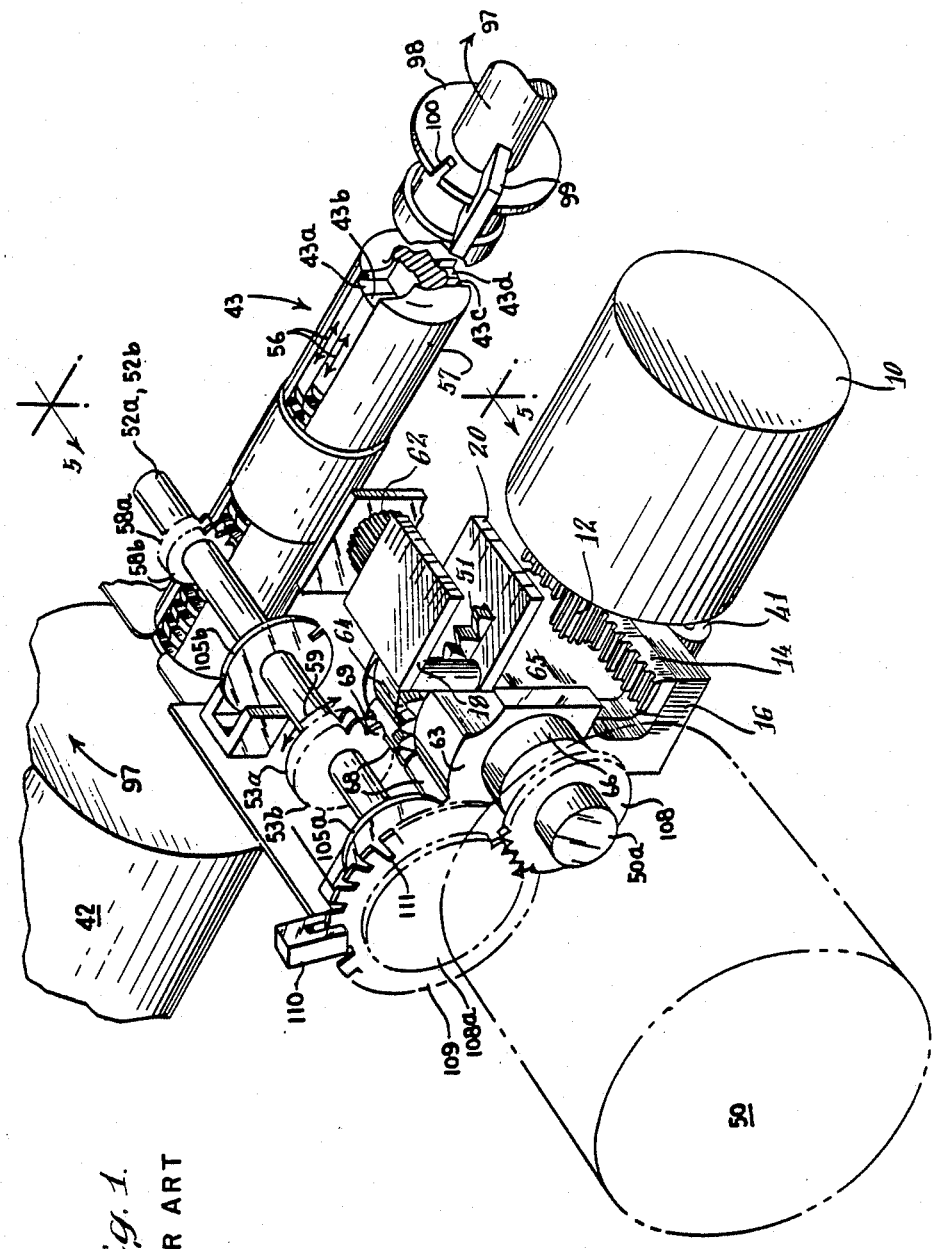
FIG. 1 is a perspective view of a known postage setting and printing apparatus.

Referring to FIG. 1, a meter setting mechanism constructed in accordance with the present invention is used, in a preferred embodiment, to set print wheels contained within a print drum 42.

The print wheels (not shown) within drum 42 are st by a mechanism driven by first stepping motor 50 and a second stepping motor 10. Signals for controlling the operation of the stepping motors 50 and 10 would normally be provided by an electronic control 11 of the type disclosed in the above referenced patent, including a conventional communications link 11a.

Mechanical features of the meter setting mechanism are described with reference to FIGS. 1, 2, and 3. The stepping motor 50 drives an upper and lower set 43 of postage wheel driving racks (consisting of racks 43a, 43b, 43c, 43d) through a gearing assembly including upper and lower nested shafts 52a, 52b, 52c, and 52d, respectively. The angular positions of the upper shafts 52a, 52b, and the lower shafts 52c, 52d are controlled by a master gear 51 which may be driven in either a clockwise or a counterclockwise direction by the stepping motor 50.

The print drum 42 has four independently-positioned print wheels (not shown) which provide a postage impression to the maximum sum of $99.99. Each print wheel provides a separate digit of this sum and can be set from "0" to "9". The print wheels are sequentially set by the meter setting mechanism by means of the four driving racks 43a, 43b, 43c, 43d. The driving racks are slidable within print drum shaft 57 in the direction indicated by the double-headed arrows 56.

The settings of the upper racks, 43a and 43b are controlled by pinion gears 58a and 58b, respectively. The settings of the lower racks 43c and 43d are controlled by a similar set of pinion gears not shown in the drawings. The pinion gear 58a is attached to the inner shaft 52a while the pinion gear 58b is attached to the concentric outer shaft 52b. The pinion gears which control the settings of driving racks 43c, 43d are similarly attached to nested shafts 52c and 52d, shown only in FIG. 3. The angular positions of the nested shafts 52a, 52b, 52c, 52d are controlled by shaft-mounted spur gears 53a, 53b, 53c, 53d. The master gear 51 can be shifted laterally along an axis parallel to the axis of the spur gears 53a, 53b, 53c, 53d to intermesh with a single gear at a time. The master gear 51 is rotatably mounted within a slot 64 in a yoke 63 which slides along a splined shaft 62. The yoke 63 is held away from rotatable engagement with splined shaft 62 by an interposed sleeve bushing 66. The master gear 51 engages the gears 53a, 53b, 53c to rotate the shafts 32a and 526 in either direction as indicated by arrow 59, 53d in the sequential order: 53b, 53a, 53d, 53c. In this order, gear 53b controls the setting of the "tens of dollars" print wheel, gear 53a controls the "dollars" print wheel, gear 53d controls the "tens of cents" print wheel and gear 53c controls the "units cents" print wheel.

The yoke 63 includes a pair of upper and lower tooth trough walls 68 and 68' located on the upper and lower surfaces of the yoke 63. As the yoke 63 and master gear 51 slide laterally along the splined shaft 62, as indicated by arrow 65, the upper and lower laterally-extending walls 68 and 68' slide along either side of one of the teeth in each of the spur gears. The tooth troughs prevent rotational movement of any of the spur gears other than a spur gear meshed with master gear 51.

The lateral position of yoke 63 and the master gear 51 is controlled by stepping motor 10, the output shaft of which carries a splined gear 12. The splined gear 12 meshes with a rack 14 attached to yoke 63 at an L-shaped, lower extension 16. The clockwise or counterclockwise rotation of splined gear 12 upon energization of stepping motor 10 is translated into lateral movement of yoke 63 through the rack and pinion arrangement. The splined gear 12 prevents counterclockwise rotation of yoke 63 due to any friction between rotating sleeve bushing 66 and the yoke 63. A roller 41 mounted beneath L-shaped extension 16 prevents any clockwise movement of yoke 63.

When the print wheels within print drum 42 are set to the correct postage value position, drum 42 is rotated by means of shaft 57 in a direction indicated by arrow 97 to imprint that postage. The drum 42 is then returned to a home position sensed by a slotted disk 98 affixed to shaft 57. When a slot 100 of disk 98 moves between the arms of an optical detector 99, the shafts 57 is at its home position.

All optical detectors of the setting mechanism are basically U-shaped structures having a light emitting diode located in one arm and a phototransistor located in the other arm of the U-shaped structure. Light emitted by the light emitting diode is transmitted to the phototransistor only when the slot is aligned with the arms of the read-out well.

The home positions of shafts 52a and 52b which are the "0" settings for the "dollars" and "tens of dollars" print wheels are similarly monitored by slotted disks 105a and 105b, respectively, in combination with optical detectors adjacent those slotted disks. The home positions of shafts 52c and 52d which are the "0" settings for the "cents" and "tens of cents" print wheels are monitored by similar slotted disks and optical detectors. It is necessary to reset each of the print wheels to the "0" setting on start-up. Thereafter, the settings of the print wheels are monitored to permit resetting from previously established wheel positions.

The angular movement of the stepping motor shaft 50a, (and consequently splined shaft 62 and master gear 51) is monitored through an assembly including gears 108 and 108a, slotted monitoring wheel 109 and optical detector 110. When the stepping motor shaft 50a, turns, gear 108, which is mounted on shaft 50a, must also turn through the same angle. Gear 108 intermeshes with gear 108a carried by the slotted monitoring wheel 109 causing wheel 109 to rotate in correspondence with rotation of shaft 50a. Every fifth slot 111 on monitoring wheel 109 is extra long to provide a check on the monitoring wheel operation. Each slot on wheel 109 corresponds to a change of one unit of postage value. Optical detector 110 has two photosensors. One of the photosensors is mounted near the bight of the U-shaped detector structure; that is, near the periphery of monitoring wheel 109. This photosensor monitors every step of the stepping wheel 109. The other sensor is located near the ends of the arms of detector 110. This photosensor receives light from an associated light source on the opposite side of the monitoring wheel 109 only when the extra long slot 111 is aligned with the detector arms. Thus, this sensor monitors every fifth step of the monitoring wheel 109. The number of slots on wheel 109 which pass through detector 109 during rotation of motor 50 are counted in a control unit for the meter. If the counter does not contain a count of five when the output from the second photosensor in detector 110 is sensed (indicating long slot 111 is aligned in the detector), an error condition exists.

The lateral position of yoke 63 and master gear 51 is monitored by a position indicator including a pair of spaced plates 18, 20 attached directly to yoke 63. Plates 18 and 20 include slot patterns which are binary-encoded representations of the position of the yoke relative to optical detectors 22, 24, 26 all of which are attached to an L-shaped bracket 28 on stepping motor 10. Each different slot pattern identifies a particular position of yoke 63.

Figure 4:
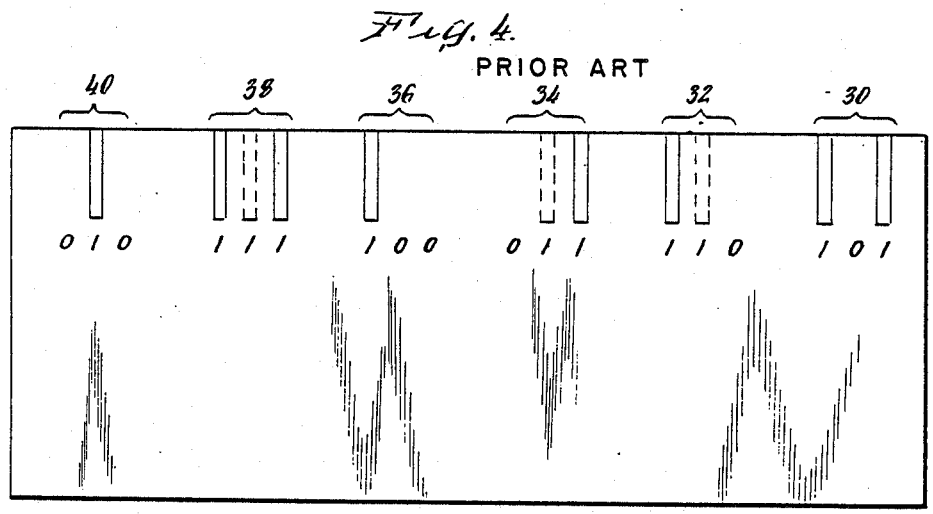
FIG. 4 is a plan view of one embodiment of a position encoder.

The slot patterns may be more clearly with reference to FIG. 4, which is a plan view of plate 18. Slots appearing in plate 20, which is vertically aligned with plate 18 and therefore substantially hidden, are shown in dotted outline form.

In a preferred embodiment of the invention, plates 18 and 20 have six different binary slot patterns identifying six lateral position for yoke 63. Each of the slot patterns consists of a unique triplet in which the presence of a slot in either plate 18 or plate 20 is interpreted as a binary one while the absence of a slot in any position where a slot might appear is interpreted as a binary zero. The binary indicia for the two outside positions in each triplet are included on plate 18. The binary indicia for the center position in each triplet is included on plate 20. The binary indicia are distributed between two vertically aligned plates only because optical detectors 22, 24, 26 are too bulky to permit three detectors to be placed side by side on a single plate of reasonable size. From a logic standpoint there is no significance to the fact the indicia are distributed between two plates. The indicia are read and interpreted as if they were contained on a single plate.

Position 30, identified by the binary slot pattern "101" is the detected slot pattern when master gear 51 is meshed with the spur gear for the "tens of dollars" bank of the postage meter. Position 32, identified by binary slot pattern "110", is detected when master gear 51 meshes with the spur gear for the "dollars" printing wheel. Position 34, identified by binary pattern "011", is detected when master gear 51 meshes with the spur gear which sets the "tens of cents" print wheel on the postage meter. The "cents" print wheel is set by master gear 51 in position 36, identified by the binary pattern "100".

Positions 38 and 40, identified by binary patterns "111" and "010", respectively, serve security pruposes. After each of the print wheels has been set by the master gear 51, yoke 63 is shifted to an "enabled" position 40 which is the only position in which shaft 57 can rotate to imprint the set postage. A mechanical interlock between the yoke 63 and a shutter bar described in more detail below is released only in this position to assure the printing cannot occur if the meter is not ready due to any reason or if an error has occurred or if insufficient funds are available in the meter register by a slight rotation of stepper motor and is released by an opposite rotation prior to setting the print wheels.

Position 38, referred to as a disabled position, is a position wherein each of the spur gears 53a, 53b, 53c, 53d is mechanically locked by the projecting trough walls 68, 68' on the surface of yoke 63. Since yoke 63 is held from counterclockwise rotation by spline gear 12 and from clockwise rotation by roller 41, the trough walls mechanically lock the print wheels to prevent anyone from forcing the accessible print wheels into a new position. Any attempt to tamper with the meter in this manner would be readily detected since the print wheel positions could not be altered without mechanically damaging the yoke gears. The yoke 63 is spring-biased from the enabled position to the disabled position upon loss of power to stepping motors of 10 and 50. The biasing spring is part of a print interlock mechanism, one possible embodiment of which is described in more detail below.

Details of print interlock mechanism are described with reference to FIGS. 5-9. While the description describes a shutter bar interlock system not unlike that in actual use within the meter, the actual details and the exact construction and operation of this system are not shown for purposes of security. FIG. 5 is a view along lines 5—5 of FIG. 1 with a number of elements omitted for the sake of simplicity. The print interlock mechanism includes a shutter bar 150 which, in the illustrated extreme left or blocking position, extends into slots 152 and 154 in drive plates 156 and 158, respectively. Drive plate 156 is rigidly coupled to and rotates with the shaft of a print motor (not shown). Drive plates 156 and 158 are coupled through a pin 160 which rotates plate 158, and consequently shaft 57 and print drum 42, when the print motor is energized. The shutter bar 150 is held in the blocking position by a camming extension 162 when extends laterally from yoke 63. The camming extension 162 holds the shutter bar 150 in the blocked position against biasing forces provided by a coil spring 164 trapped between a rib 166 on shutter bar 150 and another rib 168 extending upwardly from a stationary frame 170.

Referring to FIG. 7, the meter is enabled when yoke 63 is driven toward a frame member 172 and held there by motor 10. In this position, a coil spring 174 mounted on a pin 176 affixed to frame 172 will be compressed by the yoke with the head 178 of the pin entering a recess 180 in a lower portion of the yoke 63. Movement of yoke 63 to an extreme right hand position withdraws camming extension 162 from contact with shutter bar 150, allowing coil spring 164 to force shutter bar 150 away from drive plates 156 and 158. This is illustrated in FIG. 6. When the left end of shutter bar 150 is clear of drive plates 156 and 158, the print interlock is released, permitting plates 156 and 158, shaft 57 and print drum 42 to rotate to imprint the postage.

Figure 8:
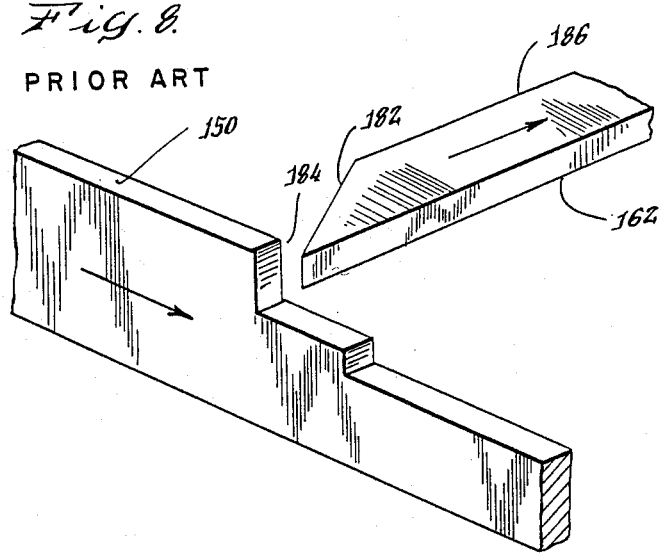
FIGS. 8 and 9 are detailed partial perspective views of a shutter bar and camming extension in the print interlock mechanism.
Figure 9:
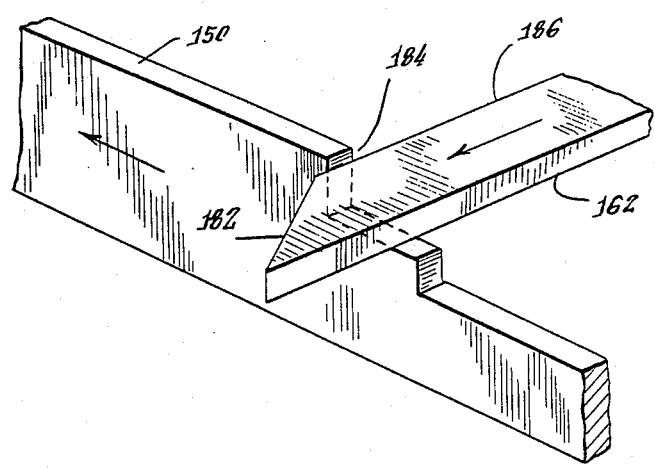

The shutter bar 150 is returned to a blocking position by camming extension 162 when yoke 63 is shifted to any position other than the enabled position. The camming action is illustrated in FIGS. 8 and 9. In FIG. 8, camming extension 162 is withdrawn from contact with shutter bar 150 as it would be when yoke 63 has been shifted to the extreme right and/or enabled position. With camming extension 162 withdrawn, coil spring 164 can force shutter bar 150 to the right or to a released position.

As yoke 63 leaves the enabled position, camming extension 162 is shifted into contact with shutter bar 150. An angled surface 182 on extension 162 bears against a shoulder 184 of shutter bar 150 to force the shutter bar to the left against the force of spring 164. The shoulder 184 of shutter bar 150 is seated against an edge 186 of camming extension 162 when the yoke 63 is in any position other than the enabled position.

The simple mechanical interlock provided by shutter bar 150 and camming extension 162 positively prevent printing unless the yoke 63 is in the enabled position. Due to the simplicity and reliability of the print interlock, no other mechanical or electrical interlocks are needed.

Referring again to FIG. 7, the independently-rotatable spur gears 53a, 53b, 53c and 53d are shown in simplified form. The spacing of the spur gears and the size of yoke 63 is such that a tooth 69 of each of the spur gears rides in one of the tooth troughs on the yoke surface when yoke 63 is in either its enabled or disabled positions. When yoke 63 is in one of the other positions (generally referred to a bank select position), one of the spur gears will be aligned with the master gear 51.

As indicated earlier, the tooth troughs mechanically lock the print wheels into position, preventing the repositioning of the print wheels from the exterior of the meter. Thus, in either the enabled position of the yoke or the disabled position (to which the yoke is returned either by normal operation of motor 10 or by coil spring 174 upon loss of power when the meter is enabled), the print wheel settings cannot be altered. Also, since all spur gears are held in alignment in both the enabled and disabled positions, there is little risk the mechanism will be jammed in the enabled position.

Figure 10:
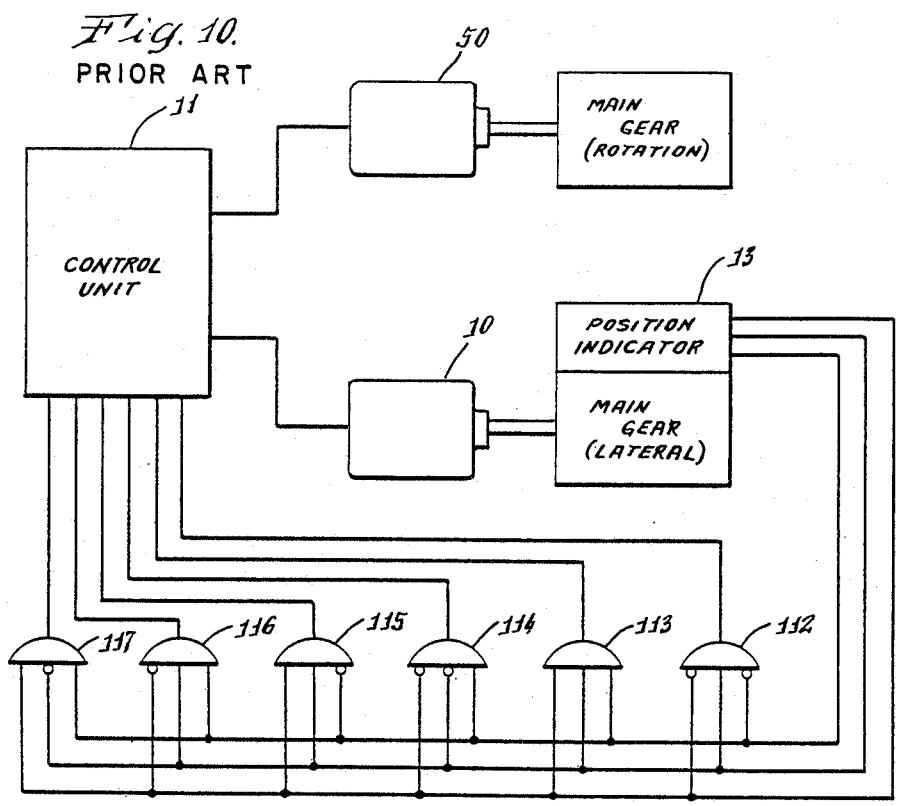
FIG. 10 is a simplified schematic representation of one type of position recognitional logic with may be employed with the meter setting mechanism of FIG. 1.

Referring to FIG. 10, a control unit 11 for setting the meter is shown only in block diagram form since the control unit 11 is not part of the present invention. Any control unit which can provide a series of stepping motor pulses for stepping motor 50 and stepping motor 10 would suffice. Stepping motor 50, of course, controls the rotary motion of the master gear. Lateral movement of the master gear is controlled by stepping motor 10. The lateral position of the master gear is detected by the position indicator consisting of plates 18, 20 and optical detectors 22, 24, 26 all of which are indicated only by position indicator block 13.

The outputs of the optical detectors in the position indicator consist of three binary signals which, is one embodiment of the invention, could be applied to a series of AND gates 112, 113, 114, 115, 116, 117. The output of each AND gate is normally low, going high only when a particular binary triplet of signals is applied at the input. For example, the output of AND gate 112 goes high if, and only if, binary pattern "010" is detected by the optical detectors. The AND gates effectively serve as a decoder for the detectors permitting one of six possible position signals to be applied to control unit 11 based on the readings of the three detectors.

While six laterally-spaced yoke positions exist in the illustrated embodiment, it would be a very simple matter to add any number of laterally-spaced positions. Additional binary-encoded slot patterns would have to be provided on plates 18 and 20. Depending on the number of additional positions desired, additional optical detectors might be needed.

The triplet patterns are not arranged in the normal binary sequence. To reduce the chances of an undetected error, the triplet patterns have been selected so that at least two out of the three binary digits change as the yoke moves from one position to an adjacent position.

Figure 11:
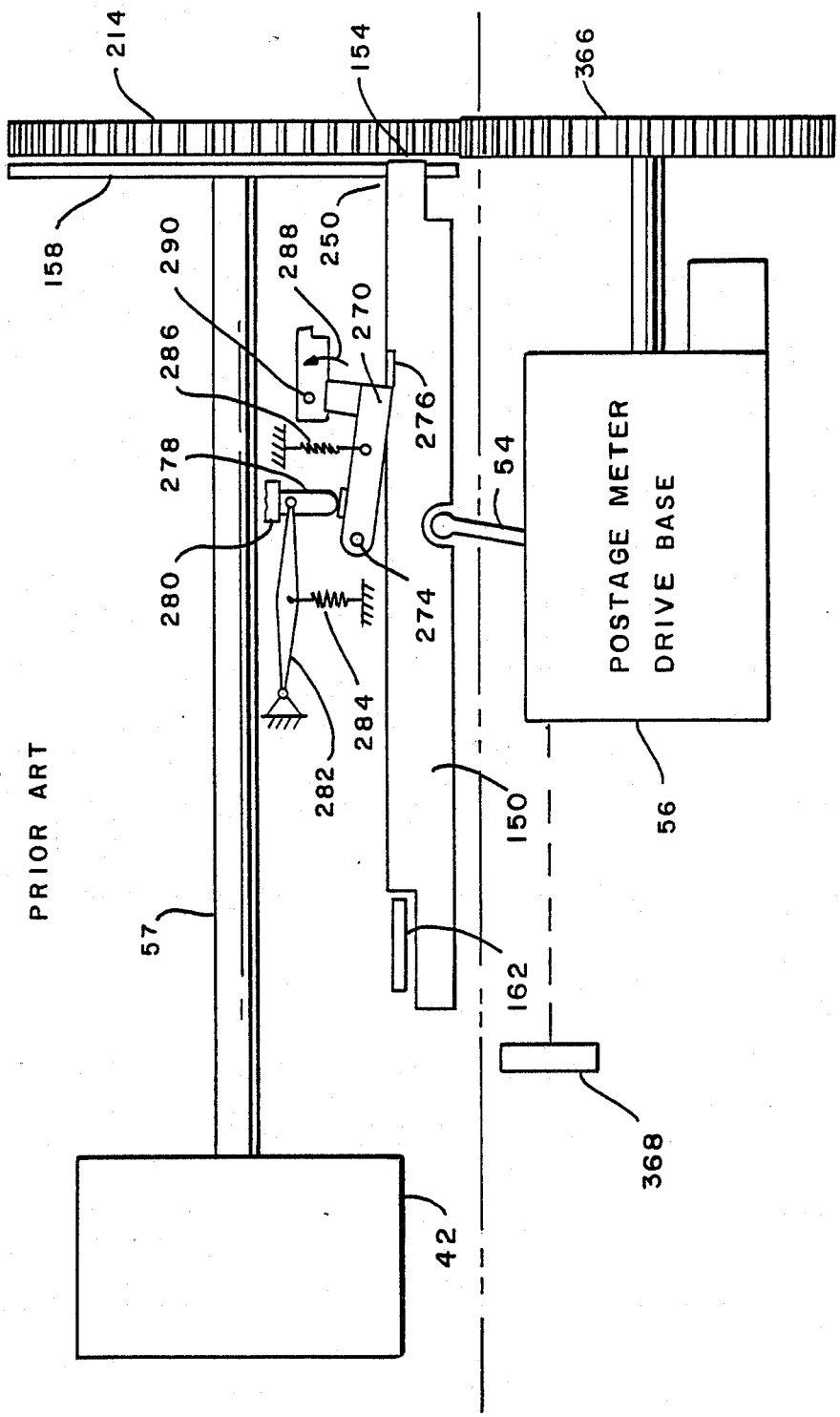
FIG. 11 is a semi-schematic illustration of the relation between a postage meter printing and setting mechanism and a postage meter drive base.

FIG. 11 shows an embodiment of the subject invention, in semi-schematic form, wherein the print drum 42 is driven by a conventional postage meter drive base 56. Plate 156 is replaced by gear 214 which engages gear 66 in base 56. Base 56 transports mailpieces past drum 42 for imprinting with appropriately set indicia. When a mailpiece strikes trip lever 368 base 56 operates lever 54 to move shutter bar 150 out of the blocking position engaging opening at 154 and plate 158, then drives gear 366 to energize print drum 42 through shaft 57, plate 158, and gear 214.

Movement of shutter bar 150 from the blocking position is controlled by mechanical interlock 162 and interposer 270. The operation of interlock 162 may be controlled in the manner described above, or in other conventional manner, and the operation of interposer 270 will be described further below.

Interposer 270 is pivoted about pivot 274 to engage shoulder 276 secured to shutter bar 150. Interposer 270 is held in position to secure shutter bar 150 by the force exerted downwardly on plunger 278 of solenoid 280 by springbiased lever 282. The force of spring 284 is sufficient to overcome the opposing force of relatively light spring 286.

When solenoid 280 is energized, plunger 278 retracts and interposer 270 rotates in the direction of arrow 288 under the force of spring 286 until it engages stop 290. In this position interposer 270 is moved out of engagement with shoulder 276 and shutter bar 150 is released.

The arrangement of interposer 270 and its associated components is further disclosed in U.S. Pat. No. 4,253,015 to: McFiggans et al.; for: Electronic Postage Meter having an Accounting System Independent of Power Failure; issued: Feb. 24, 1981.

FIG. 12 shows the novel control sequence of the postage meter of the subject invention.

At 300 meter control 11 waits for a first signal indicating that a mailpiece is on an upstream postal scale and that the determination of a new postage amount may be expected. Further description of such a system is provided in the above referenced commonly assigned U.S. Patent application. When the first signal is received control 11 deenergizes solenoid 280 to set interposer 270 to secure shutter bar 150. At 304 stepper motor 10 is rotated slightly to release yoke 63 from the enabled position. At 306 yoke 63 is driven to select the ten cent bank. The ten cent bank is selected since it is the highest value bank which may reasonably be expected to change for letters of a reasonable weight under postage rates anticipated in the foreseeable future.

At 310 common preliminary steps have been taken to enable setting of the print wheels and the system waits for a second signal to define the next postage value. At 312 when the second signal is received the next postage amount is compared to the last postage amount to which the indicia are set. If the next and last amounts are not equal at 314 stepper motor 50 is energized to set the ten cent bank yoke 63 is shifted by stepper motor 10 to the one cent bank, which is then set and, at 316 yoke 63 is returned to the enable position if the next and last amounts are equal in the step 312, the control sequence branches directly to the step 316.

At 318 control 11 transmits a signal to the upstream postage scale to request transport of the next mailpiece. Since the next postage amount has been determined by the postal scale the next mailpiece may be immediately transported to the meter.

While the next mailpiece is in transit at 320 stepper motor 10 is counter-rotated to against secure yoke 63 in the enabled position, at 322 stepper motors 10 and 50 are deenergized, and at 324 solenoid 280 is energized to release shutter bar 150.

Printing is now enabled and the system waits at 326 for a trip generated by the arrival of the next mailpiece. Note that should the next mailpiece arrive before printing is enabled the mailpiece will pass through the system without printing since if the last step, at 324, is not completed shutter bar 150 will remain in the blocking position otherwise the shutter bar 150 will be in the unblocking position.

In a system as shown in FIG. 11, where print drum 42 is driven by postage meter drive base 56, base 56 will shift shutter bar 150 to the non-blocking position at 328, drive print drum 42 at 330, and reshift shutter bar 150 to the blocking position at 340.

The cycle then returns to 300 to await the next mailpiece.

Other postage meter systems where a trip signal is provided electronically are well known and the adaptation of the above control sequence to such meters would be readily understandable by those skilled in the art.

Those skilled in the art will recognize that the above descriptions and the attached drawings have been provided by way of illustration only and that numerous other embodiments of the subject invention will be apparent to those skilled in the art from consideration of the above description and the attached drawings. Particularly, it will be apparent that innumerable modifications to the mechanical structure of the printing and setting mechanism and minor changes to the sequence of control are within the contemplation of the subject invention. Accordingly limitations on the scope of the subject invention are to be found only in the claims set forth below.

What is claimed is:

1. A postage meter having printing means for printing indicia corresponding to predetermined postage amounts on mailpieces and for accounting for said postage amounts when said indicia are printed, said postage meter comprising:
   a. means for communicating with a scale and for receiving first and second signals from said scale;
   b. preliminary setting means for implementing common, preliminary steps necessary for setting said indicia printing means to correspond to said next postage amount in response to said first signal; and
   c. second setting means for setting said indicia printing means to correspond to said next postage amount in response to said second signal.

2. A postage meter as described in claim 1 wherein said second setting means has an enable position such that said any changes to the setting of said indicia made while said second setting means is in said enable position will be detected, and wherein said preliminary steps include transferring said second setting means from said enable position to a position selecting a preselected bank, wherein said preselected bank is the highest value bank likely to be changed by said next postage amount.

3. The postage meter of claim 1 further comprising means for communicating with a mailpiece transport conveyor and transmitting means, responsive to said second setting means for transmitting a signal to the mailpiece transport conveyor indicating that the next mailpiece should be conveyed to the postage meter when said indicia printing means is set.

4. The postage meter of claim 3 further comprising enabling means for implementing common enabling steps for enabling printing of said indicia printing means, said enabling means implementing said common enabling steps after transmittal of said signal to the mail piece transport conveyor.

5. The postage meter of claim 4 wherein said second setting means has an enable position such that said any changes to the setting of said indicia made while said second setting means is in said enable position will be detected, and wherein said preliminary steps include transferring said second setting means from said enable position to a position selecting a preselected bank, wherein said preselected bank is the highest value bank likely to be changed by said next postage amount.

6. The postage meter of claim 5 wherein said common enabling steps include securing said second setting means in said enable position.

7. The postage meter of claim 4 further comprising comparison means for comparing said next postage amount with the last postage amount to which said indicia had been set, said enabling means responsive to said comparison means to implement said common enabling steps without setting said indicia if said next and last postage amounts are equal.

8. The postage meter of claim 7 wherein said second setting means has an enable position such that said any changes to the setting of said indicia made while said second setting means is in said enable position will be detected, and wherein said preliminary steps include transferring said second setting means from said enable position to a position selecting a preselected bank, wherein said preselected bank is the highest value bank likely to be changed by said next postage amount.

9. The postage meter of claim 7 wherein said postage meter is responsive to said enabling means to print said indicia only if said common enabling steps are completed prior to arrival of said next mailpiece.

10. The postage meter of claim 9 wherein said common enabling steps include securing said second setting means in said enable position.

11. A postage meter having printing means for printing indicia corresponding to predetermined postage amounts onto mailpieces and for accounting for said postage amounts when said indicia are printed, said printing means having means for communicating with a meter drive base means for transporting mailpieces to said meter for printing, said postage meter comprising:
   a. drive means in communication with the meter drive base means for providing drive power to said printing means;
   b. blocking means shiftable between a blocking position and a non-blocking position for disabling said drive means from providing power to said printing means when in said blocking position;
   c. interposer means settable to secure said blocking means in said blocking position;
   d. means for communicating with a scale and for receiving a first signal to indicate that a next postage amount is to be determined and a second signal, to indicate the next postage amount;
   e. preliminary setting means, responsive to said first signal, for implementing common preliminary steps necessary for setting said indicia to correspond to said next postage amount, said preliminary steps including setting said inteposer means to secure and said blocking means; and f. second setting means, responsive to said second received signal, for setting said indicia to correspond to next postage amount.

12. The postage meter of claim 11 further comprising transmitting means, responsive to said second setting means, for transmitting a signal to the meter drive base means for requesting a next of said mailpieces to be transported to said printing means when said indicia prnting means are set.

13. The postage meter of claim 12 wherein said second setting means has an enable position such that said any changes to the setting of said indicia made while said second setting means is in said enable position will be easily detected, and wherein said preliminary steps include transferring said second setting means from said enable position to a position selecting a preselected bank, wherein said preselected bank is the highest value bank likely to be changed by said next postage amount.

14. The postage meter of claim 12 further comprising enabling means for implementing common steps for enabling printing of said indicia, said common steps including setting said interposer means to release said blocking means, and said enabling means implementing said common enabling steps after transmittal of said signal requesting said next mailpiece.

15. The postage meter of claim 14 whrein said common enabling steps include securing said second setting means in said home position.

16. A method for controlling a postage meter to increase the rate at which mixed weight mail may be processed, comprising the steps of:

a. receiving a first signal indicating that a mailpiece is on an upstream postal scale and that determination of a next postage amount will be determined;

b. responding to said first signal to implement common, preliminary steps necessary to for setting indicia to correspond to said next postage amount;

c. receiving a second signal defining said next postage amount;

d. responding to said second signal to set said indicia to correspond to said next postage amount; and e. imprinting a mailpiece with said indicia when said mailpiece is recieved.

17. A method as described in claim 16 comprising the further step of implementing common steps for enabling printing of said indicia after transmittal of said first signal.

18. A method as described in claim 16 comprising the further step of transmitting a signal requesting said mailpiece after setting said indicia.

19. A method as described in claim 18 comprising the further step of comparing said next postage amount with the last postage amount to which said indicia have been set and implementing said common enabling steps without setting said indicia if said next and last amounts are equal.

* * * * *